US008363022B2

(12) United States Patent
Tho et al.

(10) Patent No.: US 8,363,022 B2
(45) Date of Patent: Jan. 29, 2013

(54) MOBILE TERMINAL AND OPERATING METHOD OF THE MOBILE TERMINAL

(75) Inventors: Gi Hoon Tho, Seoul (KR); Myung Cheol Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 609 days.

(21) Appl. No.: 12/689,996

(22) Filed: Jan. 19, 2010

(65) Prior Publication Data

US 2010/0201643 A1    Aug. 12, 2010

(30) Foreign Application Priority Data

Feb. 6, 2009  (KR) ........................ 10-2009-0009738

(51) Int. Cl.
G06F 3/041    (2006.01)
(52) U.S. Cl. ........................................ 345/173; 345/156
(58) Field of Classification Search .................. 345/156, 345/173–179; 178/18.01–18.05
See application file for complete search history.

(56) References Cited

U.S. PATENT DOCUMENTS

| | | | |
|---|---|---|---|
| 7,663,607 B2* | 2/2010 | Hotelling et al. ............. | 345/173 |
| 2002/0110237 A1* | 8/2002 | Krishnan ..................... | 379/419 |
| 2007/0182595 A1* | 8/2007 | Ghasabian ................... | 341/22 |
| 2009/0146848 A1* | 6/2009 | Ghassabian .................. | 341/22 |
| 2010/0013796 A1* | 1/2010 | Abileah et al. ............... | 345/175 |
| 2010/0053854 A1* | 3/2010 | Nishikawa et al. ......... | 361/679.01 |

* cited by examiner

Primary Examiner — Ricardo L Osorio
(74) Attorney, Agent, or Firm — Lee, Hong, Degerman, Kang & Waimey

(57) ABSTRACT

A mobile terminal and an operating method of the mobile terminal are provided. The mobile terminal includes a transparent conductive layer configured to have a plurality of cells whose charge quantity varies in response to a touch signal, the cells being electrically isolated from one another; a plurality of pressure sensors configured to be laid over the transparent conductive layer, the pressure sensors calculating a pressure level of the touch signal and identifying a point of detection of the calculated pressure level; and a controller configured to determine whether there are two or more cells in the transparent conductive layer where a charge quantity variation is detected, wherein, if there are two or more cells in the transparent conductive layer where a charge quantity variation is detected, the controller identifies the positions of the corresponding cells and performs operations corresponding to the identified cell positions. Therefore, it is possible to effectively detect even a multi-touch input using the pressure sensors.

12 Claims, 6 Drawing Sheets

FIG. 7

MOBILE TERMINAL AND OPERATING METHOD OF THE MOBILE TERMINAL

CROSS-REFERENCE TO RELATED APPLICATION

This application claims the priority benefit of Korean Patent Application No. 10-2009-0009738, filed on Feb. 6, 2009 in the Korean Intellectual Property Office, the disclosure of which is incorporated herein by reference.

BACKGROUND OF THE INVENTION

1. Field of the Invention

The present invention relates to a mobile terminal and an operating method of controlling the mobile terminal, and more particularly, to a mobile terminal and an operating method of the mobile terminal, in which two or more touch signals can be detected at the same time using a plurality of pressure sensors.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, an increasing number of mobile terminals are being equipped with a touch screen-based data input method, instead of a keypad-based data input method, and a variety of sensors for sensing touch signals input to a touch screen such as a static pressure sensor, a capacitive sensor or a pressure sensor are being adopted in the manufacture of mobile terminals.

Pressure sensors are sensors capable of measuring pressure applied for generating a touch signal. The smaller the detection range of a pressure sensor, the more precisely the pressure sensor can detect a touch signal.

However, when two or more touch signals are received at the same time, pressure sensors may not be able to properly determine the positions of the received touch signals because they simply calculate the levels of pressure for generating the received touch signals and then a deviation of the calculated pressure levels, and determine that the received touch signals have been detected from a position where a median of the calculated pressure levels can be detected, rather than from their actual positions.

Therefore, it is necessary to develop ways to precisely detect a multi-touch signal using pressure sensors.

SUMMARY OF THE INVENTION

The present invention provides a mobile terminal and an operating method of the mobile terminal, in which a transparent conductive layer is laid over a plurality of pressure sensors so as to effectively detect two or more touch signals at the same time and perform the functions respectively corresponding to the detected touch signals.

According to an aspect of the present invention, there is provided a mobile terminal including a transparent conductive layer configured to have a plurality of cells whose charge quantity varies in response to a touch signal, the cells being electrically isolated from one another; a plurality of pressure sensors configured to be laid over the transparent conductive layer, the pressure sensors calculating a pressure level of the touch signal and identifying a point of detection of the calculated pressure level; and a controller configured to determine whether there are two or more cells in the transparent conductive layer where a charge quantity variation is detected, wherein, if there are two or more cells in the transparent conductive layer where a charge quantity variation is detected, the controller identifies the positions of the corresponding cells and performs operations corresponding to the identified cell positions.

According to another aspect of the present invention, there is provided an operating method of a mobile terminal, the operating method including providing a transparent conductive layer configured to have a plurality of cells whose charge quantity varies in response to a touch signal and a plurality of pressure sensors configured to be laid over the transparent conductive layer, the cells being electrically isolated from one another, and the pressure sensors calculating a pressure level of a touch signal and identifying a point of detection of the calculated pressure level; if an input touch signal is received, identifying one or more cells in the transparent conductive layer where a charge quantity variation is detected; and if there are two or more cells in the transparent conductive layer where a charge quantity variation is detected, performing operations corresponding to the identified cell positions.

According to another aspect of the present invention, there is provided an operating method of a mobile terminal, the operating method including providing a display module including a transparent conductive layer configured to have a plurality of cells whose charge quantity varies in response to a touch signal and a plurality of pressure sensors configured to be laid over the transparent conductive layer, the cells being electrically isolated from one another, and the pressure sensors calculating a pressure level of a touch signal and identifying a point of detection of the calculated pressure level; if an input touch signal is received through the transparent conductive layer, determining the position of the input touch signal based on at least one of the position of at least one cell in the transparent conductive layer where a charge quantity variation is detected, and a point of detection of the pressure level of the input touch signal identified by the pressure sensors; and performing an operation corresponding to the determined touch signal position.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
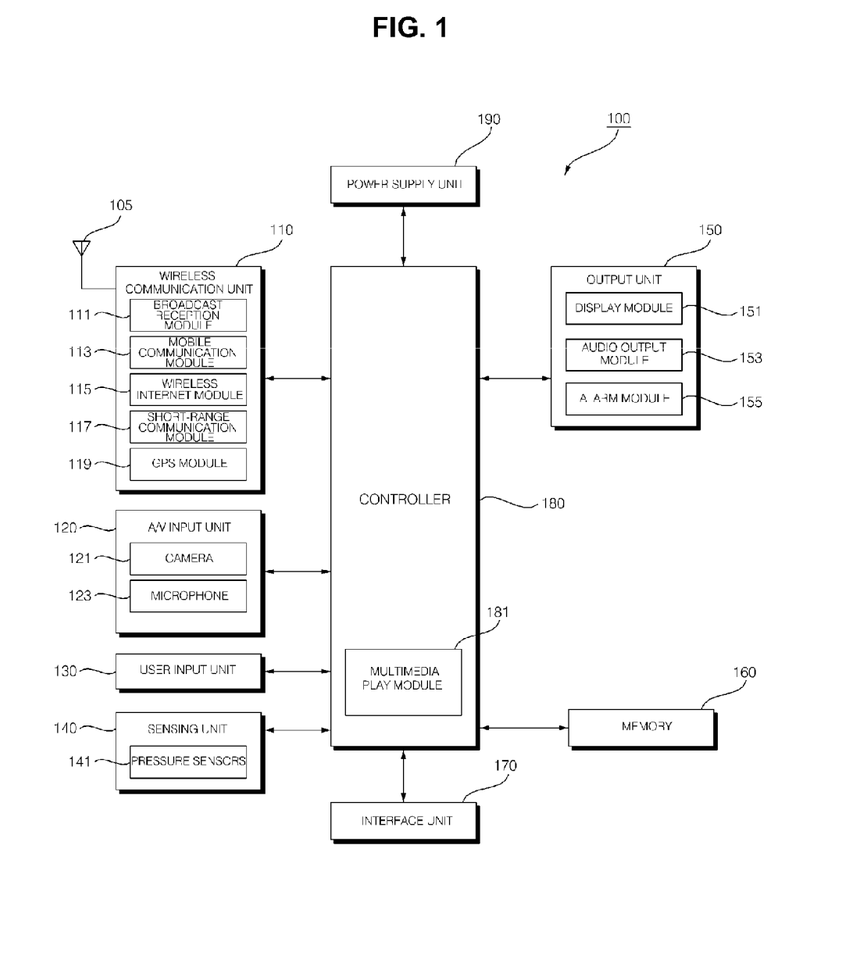
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device.

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include one or more pressure sensors 141. The pressure sensors 141 may detect a signal with pressure, i.e., a touch signal input to the display module 151 (e.g., a touch screen), may calculate the pressure level of the touch signal, and may determine the position of the touch signal based on the result of the calculation. If more than one pressure level is available, the pressure sensors 141 may calculate the deviation of the pressure levels, may determine a median of the pressure levels, and may determine a position where the median pressure level is detected as the position of the touch signal. The operation of the pressure sensors 141 will be described later in further detail with reference to FIG. 4.

The output unit 150 may output audio signals, video signals and alarm signals. The output unit 150 may include the display module 151, an audio output module 153 and an alarm module 155.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output vibration upon receiving a call signal or a message. In addition, the alarm module 155 may receive a key signal and may output vibration as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. For convenience, assume that the mobile terminal 100 is a slider-type mobile terminal equipped with a touch screen. However, the present invention is not restricted to a slider-type mobile terminal. Rather, the present invention can be applied to various mobile phones, other than a slider-type mobile terminal.

Figure 2:
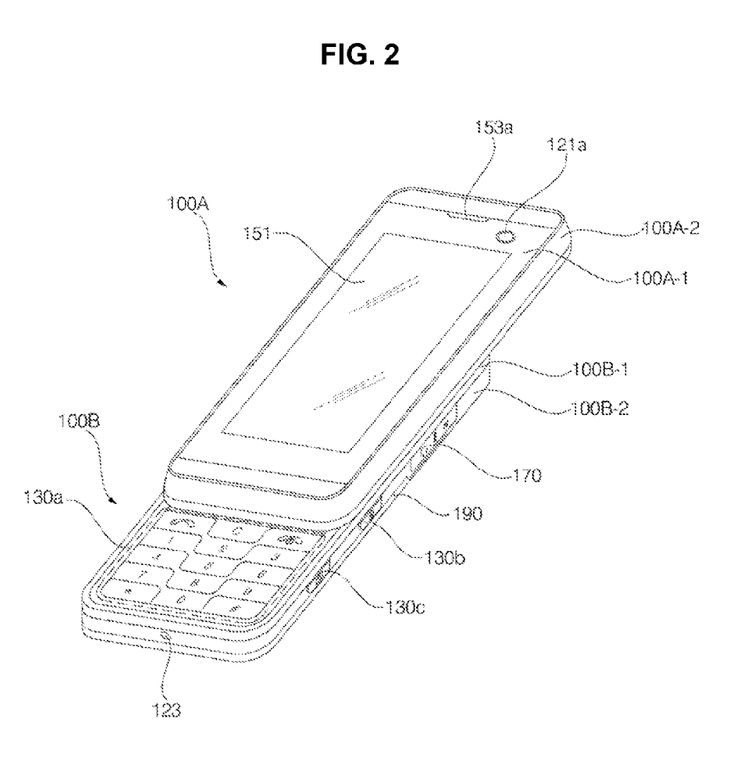
FIG. 2 illustrates a front perspective view of the mobile terminal shown in FIG. 1.

FIG. 2 illustrates a front perspective view of the mobile terminal 100 shown in FIG. 1. Referring to FIG. 2, the mobile terminal 100 may include a first body 100A and a second body 100B which can slide up or down against the first body 100A.

When the first body 100A and the second body 100B completely overlap each other, the mobile terminal 100 is referred to as being closed. On the other hand, when the first body 100A is slid up against the second body 100B and thus the front of the second body 100B is partially exposed, as shown in FIG. 2, the mobile terminal 100 is referred to as being open.

When the mobile terminal 100 is closed, the mobile terminal may generally operate in a standby mode and may be released from the standby mode in response to user manipulation. On the other hand, when the mobile terminal 100 is open, the mobile terminal 100 may generally operate in a call mode and may be switched to the standby mode either manually in response to user manipulation or automatically after the lapse of a predefined amount of time.

Referring to FIG. 2, the exterior of the first body 100A may be defined by a first front case 100A-1 and a first rear case 100A-2. Various electronic devices may be installed in the space formed by the first front case 100A-1 and the first rear case 100A-2. At least one intermediate case may be additionally provided between the first front case 100A-1 and the first rear case 100A-2. The first front case 100A-1 and the first rear case 100A-2 may be formed of a synthetic resin through injection molding. Alternatively, the first front case 100A-1 and the first rear case 100A-2 may be formed of a metal such as stainless steel (STS) or titanium (Ti).

The display module 151, a first audio output module 153a, and a first camera 121a may be disposed in the first body 100A, and particularly, in the front case 100A-1.

Examples of the display module 151 include an LCD and an OLED which can visualize information. Since a touch pad is configured to overlap the display module 151 and thus to form a layer structure, the display module 151 may serve as a touch screen. Thus, it is possible for the user to input various information to the mobile terminal 100 simply by touching the display module 151.

The first audio output module 153a may be implemented as a receiver or a speaker. The first camera 121a may be configured to be suitable for capturing a still or moving image of the user.

The exterior of the second body 100B may be defined by a second front case 100B-1 and a second rear case 100B-2. A first user input unit 130a may be disposed in the second body 100B, and particularly, at the front of the second front case 100B-1. Second and third user input units 130b and 130c, the microphone 123 and the interface unit 170 may be provided in the second front case 100B-1 or the second rear case 100B-2.

The first user input unit 130a may receive various commands for controlling the operation of the mobile terminal 100. The first user input unit 130a may include a number of input keys for providing the functions of a mouse such as a joystick key, a touchpad, a trackball, a pointing stick or a finger mouse.

The first through third user input units 130a through 130c and fourth and fifth user input units 130d and 130e may be collectively referred to as the user input unit 130. The user input unit 130 may adopt various manipulation methods as long as it can offer tactile feedback to the user.

The first user input unit 130a may allow the user to input various commands (such as 'start', 'end', and 'scroll') and various numerals, characters or symbols to the mobile terminal 100, and the second and third user input units 130b and 130c may be used as hot keys for activating certain functions.

The microphone 123 may be configured to properly receive the user's voice or other sounds.

The power supply unit 190 may be disposed in the rear case 100A-2. The power supply unit may be a rechargeable battery and may be coupled to the rear case 100A-2 so as to be attachable to or detachable from the rear case 100A-2.

Figure 3:
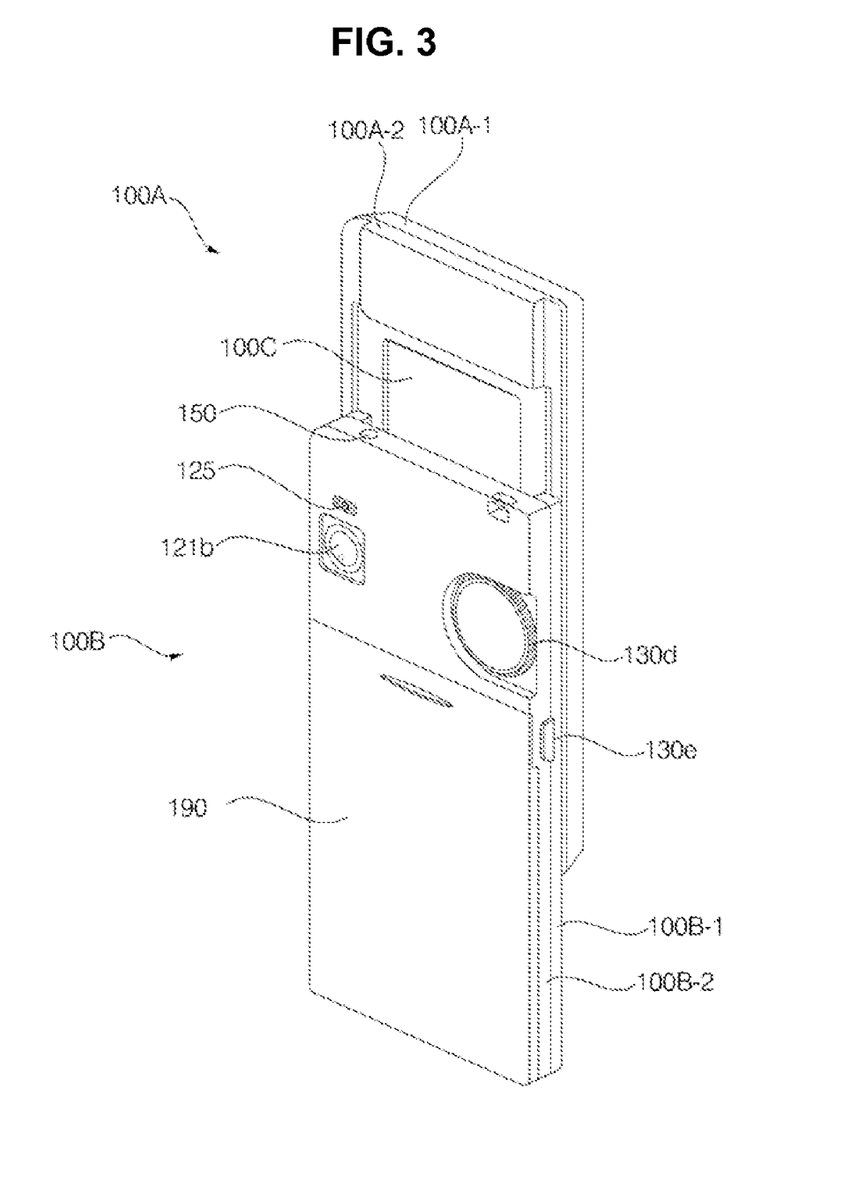
FIG. 3 illustrates a rear perspective view of the mobile terminal shown in FIG. 1.

FIG. 3 illustrates a rear perspective view of the mobile terminal 100 shown in FIG. 2. Referring to FIG. 3, the second camera 121b may be disposed at the rear of the second rear case 100B-2 of the second body 100B may be disposed on one side of the second body 100B.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

The fourth user input unit 130d may be disposed at the rear of the second rear case 100B-2 of the second body 100B. The fourth user input unit 130d may be implemented as a wheel, and may serve as a special function key such as a 'scroll' key.

A cameral flash 125 may be disposed near the second camera 121b. The cameral flash 125 may be used to illuminate a subject when the user attempts to capture an image of the subject with the second camera 121b.

A second audio output module (not shown) may be additionally provided in the second rear case 100B-2. The second audio output module may realize a stereo function along with the first audio output module 153a. The second audio output module may also be used in a speaker-phone mode.

An antenna (not shown) for making or receiving a call may be provided in the second front case 100B-1 or the second rear case 100B-2.

An antenna 105 for receiving a broadcast signal may additionally be provided on one side of the second rear case 100B-2. The antenna 105 may be installed so as to be able to be pulled out of the second rear case 100B-2.

A slide module 100C may be partially exposed on the first rear case 100A-2 of the first body 100A. The slide module 100C may couple the first body 100A and the second body 100B such that the first body 100A and the second body 100B can slide up and down against each other. A portion of the slide module 100C may be hidden from view by the second front case 100B-1 of the second body 100B, and thus may not be exposed.

The fifth user input unit 130e may be disposed on one side of the second rear case 100B-2. The fifth user input unit 130e may serve as an 'OK' key for confirming certain functions. The fifth user input unit 130e may also serve as a hot key for activating certain functions.

The second camera 121b, the antenna 105, and the camera flash 125, which have been described as being provided in the rear case 100A-2, may be provided in the front case 100A-1. In this case, when the mobile terminal 100 is closed, the second camera 121b, the antenna 105, and the camera flash 125 may be protected by the second body 100B. In addition, the first camera 121a may be configured to be rotatable and thus to cover the photographing direction of the second camera 121b. In this case, the second camera 121b may be optional.

Figure 4:
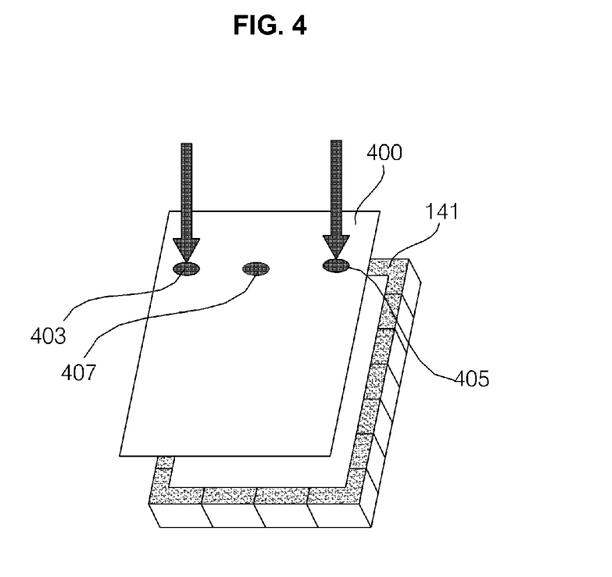
FIG. 4 illustrates the arrangement of pressure sensors in a conventional mobile terminal.

FIG. 4 illustrates the arrangement of a plurality of pressure sensors 141 in a typical mobile terminal. Referring to FIG. 4, the pressure sensors 141 may be arranged along the edges of a transparent window 400 and may be firmly attached onto the transparent window 400. The area of the transparent window 400 not overlapped by the pressure sensors 141 may serve as a display region. That is, various menu screens, images or menu icons may be displayed on the area of the transparent window 400 not overlapped by the pressure sensors 141.

When a signal with pressure, e.g., a touch signal, is received through the transparent window 400, the pressure sensors 141 may determine the position of the received signal based on the level of pressure of the touch signal.

If two touch signals are detected from two positions 403 and 405, respectively, the pressure sensors 141 may calculate the pressure levels of the two touch signals and may mistakenly determine that the two touch signals are being detected from a position 407 where a median of the pressure levels of the two touch signals can be detected, instead of from their actual positions.

Figure 5:
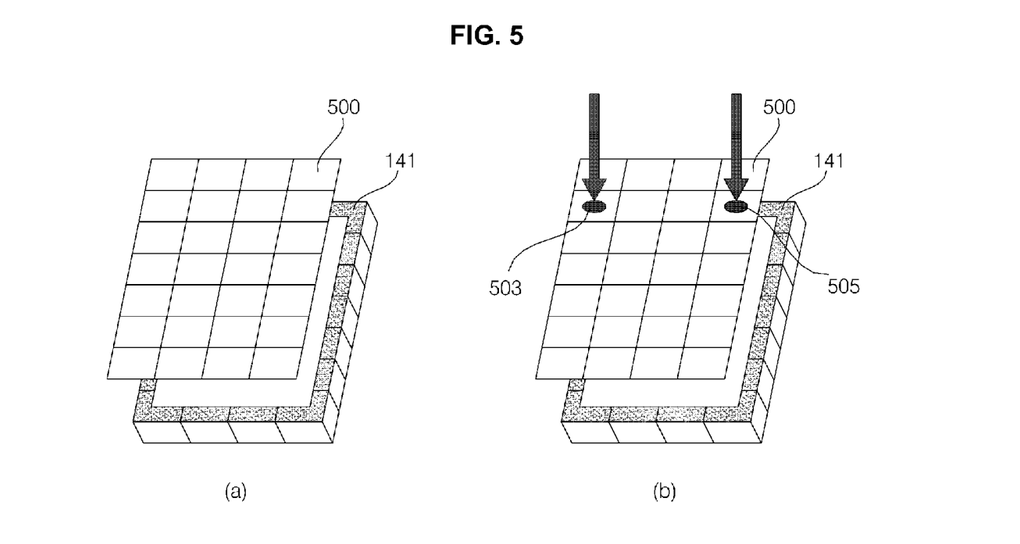
FIG. 5 illustrates the arrangement of pressure sensors in the mobile terminal shown in FIG. 1.

FIG. 5 illustrates the arrangement of a plurality of pressure sensors 141 in the mobile terminal 100. Referring to FIG. 5(a), the pressure sensors 141 may be arranged along the edges of a transparent conductive layer 500 and may be firmly attached onto the transparent conductive layer 500. The area of the transparent conductive layer 500 not overlapped by the pressure sensors 141 may serve as a display region.

The transparent conductive layer 500 may be formed of a material whose charge quantity varies in response to an input touch signal, for example, indium-tin-oxide (ITO). The transparent conductive layer 500 may be formed through etching to have a plurality of patterns that are electrically isolated from one another. That is, the transparent conductive layer 500 may have a plurality of cells whose charge quantity varies individually, and the cells may be electrically isolated from one another.

The size of the cells of the transparent conductive layer 500 may be greater than the detection range of the pressure sensors 141. Thus, the pressure sensors 141 may be able to precisely detect touch signals and determine the positions of the touch signals. Therefore, the controller 180 may be able to effectively perform operations corresponding to the touch signals detected by the pressure sensors 141 based on the results of the determination performed by the pressure sensors 141.

The controller 180 may determine whether there are cells in the transparent conductive layer 500 where a charge quantity variation is detected. Thereafter, if it is determined that there are two or more cells in the transparent conductive layer 500 where a charge quantity variation is detected, the controller 180 may identify the positions of the corresponding cells, and may perform operations respectively corresponding to the identified cell positions. If it is determined that there is only one cell in the transparent conductive layer 500 where a charge quantity variation is detected, the controller 180 may identify the position of the corresponding cell, and may perform an operation corresponding to the identified cell position. In this case, the controller 180 may perform different operations in accordance with a pressure level calculated by the pressure sensors 141.

Referring to FIG. 5(b), if two or more touch signals are received, the controller 180 may determine whether there are two or more cells in the transparent conductive layer 500 where a charge quantity variation is detected, and may identify the positions of the corresponding cells. Thereafter, the controller 180 may perform operations respectively corresponding to the identified cell positions.

Figure 6:
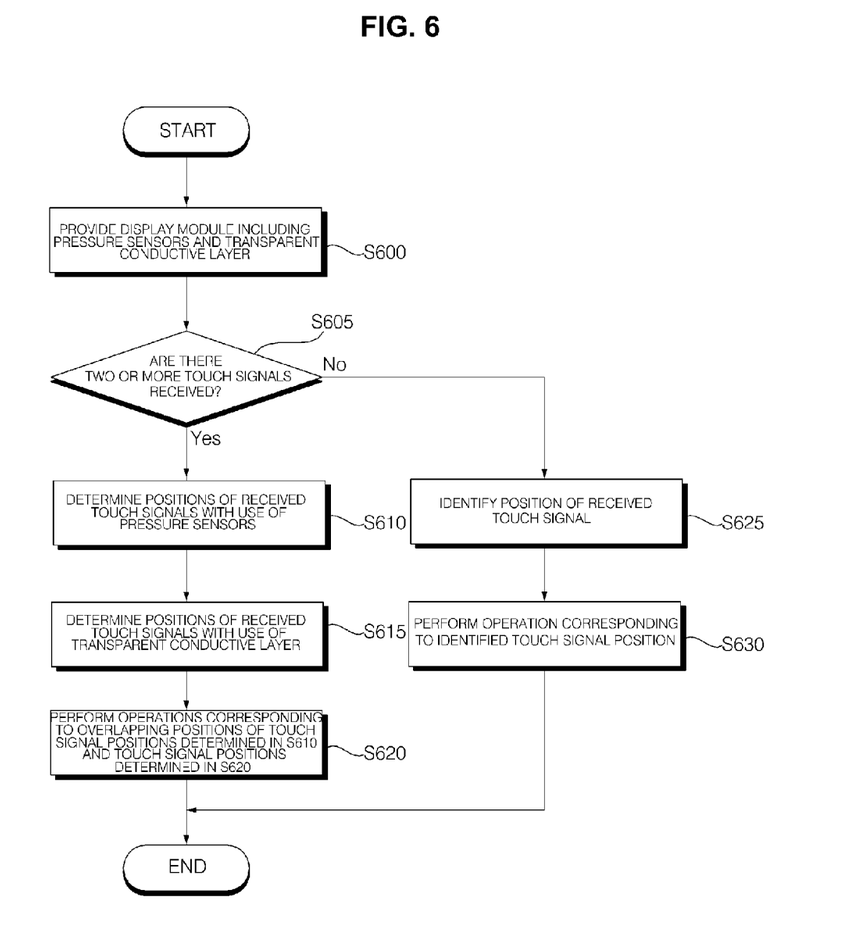
FIG. 6 illustrates a flowchart of an operating method of a mobile terminal, according to an exemplary embodiment of the present invention.

FIG. 6 illustrates a flowchart of an operating method of a mobile terminal, according to an exemplary embodiment of the present invention. Referring to FIG. 6, a display module 151 including a transparent conductive layer 500 onto which the pressure sensors 141 are attached may be provided (S600). Thereafter, an input touch signal may be input to the mobile terminal 100 through the transparent conductive layer 500 (S605).

Thereafter, the controller 180 may determine whether there are two or more cells in the transparent conductive layer 500 where a charge quantity variation is detected (S610).

If it is determined in operation S610 that there are two or more cells in the transparent conductive layer 500 where a charge quantity variation is detected, the controller 180 may identify the positions of the corresponding cells (S615). Thereafter, the controller 180 may perform operations respectively corresponding to the identified cell positions (S620). For example, if the cells where a charge quantity variation is detected include first and second cells, the controller 180 may identify the positions of first and second cells and may perform first and second operations corresponding to the first and second cells, respectively, at the same time. Alternatively, the controller 180 may perform the first and second operations at the same time only when the first and second cells are selected at the same time. In this case, the controller 180 may perform the first and second operations in consideration of the pressure level of the input touch signal, calculated by the pressure sensors 141.

If it is determined in operation S610 that there is only one cell in the transparent conductive layer 500 where a charge quantity variation is detected, the controller 180 may calculate the pressure level of the input touch signal with the aid of the pressure sensors 141, and may identify the point of detection of the calculated pressure level (S625). Thereafter, the controller 180 may perform an operation corresponding to the identified pressure level detection point (S630). More specifically, the controller 180 may perform different operations for the same pressure level detection point according to the calculated pressure level. For example, if the calculated pressure level is 0.2, the volume of the audio output module 153 may be lowered. On the other hand, if the calculated pressure level is 0.8, the volume of the audio output module 153 may be increased.

The controller 180 may also identify the position and pressure level of the input touch signal not only based on the position of at least one cell in the transparent conductive layer 500 where a charge quantity variation is detected but also based on the point of detection of the same pressure level as that of the input touch signal.

Figure 7:
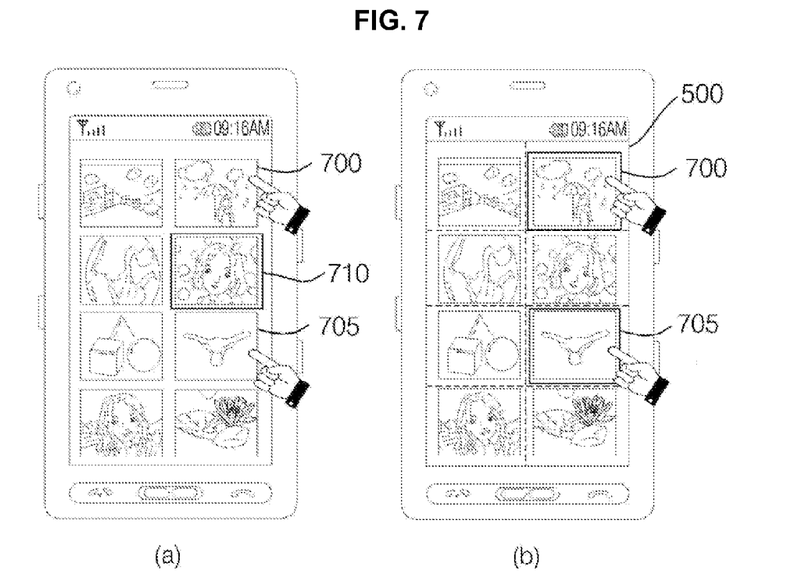
FIG. 7 illustrates diagrams for explaining the operating method shown in FIG. 6.

FIG. 7 illustrates diagrams for explaining the operating method shown in FIG. 6. More specifically, FIG. 7(a) illustrates an operating method of a conventional mobile terminal. Referring to FIG. 7(a), when an input touch signal for selecting first and second regions 700 and 705 is received, a third region 710 may be identified as the point of detection of the pressure level of the input touch signal, and thus, an image displayed in the third region 710 may be selected.

FIG. 7(b) illustrates the operating method shown in FIG. 6. Referring to FIG. 7(b), if an input touch signal for selecting first and second regions 700 and 705 is received, the charge quantity of cells corresponding to the first and second regions 700 and 705 may vary in response to the input touch signal, and thus, images respectively displayed in the first and second regions 700 and 705 may both be selected. If an input touch signal for selecting the first region 700 only is received, the charge quantity of the cell corresponding to the first region 700 may vary in response to the input touch signal, and an image displayed in an identified point of detection of the pressure level of the input touch signal, i.e., the image displayed in the first region 700, may be selected.

The mobile terminal according to the present invention and the method of controlling the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to provide a mobile terminal capable of effectively sensing not only a single touch input but also a multi-touch input by adopting a relatively simple structure including a plurality of pressure sensors and a transparent conductive layer having a plurality of cells electrically isolated from one another.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal comprising:
   a transparent conductive layer configured to have a plurality of cells whose charge quantity varies in response to a touch signal, the cells being electrically isolated from one another;
   a plurality of pressure sensors configured to be laid over the transparent conductive layer, the pressure sensors calculating a pressure level of the touch signal and identifying a point of detection of the calculated pressure level; and
   a controller configured to determine whether there are two or more cells in the transparent conductive layer where a charge quantity variation is detected, wherein, if there are two or more cells in the transparent conductive layer where a charge quantity variation is detected, the controller identifies the positions of the corresponding cells and performs operations corresponding to the identified cell positions.

2. The mobile terminal of claim 1, wherein, if there is only one cell in the transparent conductive layer where a charge quantity variation is detected, the controller performs an operation corresponding to the identified point of detection of the calculated pressure level.

3. The mobile terminal of claim 2, wherein the operation corresponding to the identified point of detection of the calculated pressure level varies according to the calculated pressure level.

4. The mobile terminal of claim 1, wherein the transparent conductive layer is formed of indium-tin-oxide (ITO).

5. The mobile terminal of claim 1, wherein the cells have a larger size than the detection range of the pressure sensors.

6. The mobile terminal of claim 1, wherein the cells are electrically isolated from one another by etching.

7. An operating method of a mobile terminal, the operating method comprising:
   providing a transparent conductive layer configured to have a plurality of cells whose charge quantity varies in response to a touch signal and a plurality of pressure sensors configured to be laid over the transparent conductive layer, the cells being electrically isolated from one another, and the pressure sensors calculating a pressure level of a touch signal and identifying a point of detection of the calculated pressure level;
   if an input touch signal is received, identifying one or more cells in the transparent conductive layer where a charge quantity variation is detected; and
   if there are two or more cells in the transparent conductive layer where a charge quantity variation is detected, performing operations corresponding to the identified cell positions.

8. The operating method of claim 7, further comprising, if there is only one cell in the transparent conductive layer where a charge quantity variation is detected, performing an operation corresponding to the identified point of detection of the calculated pressure level.

9. The operating method of claim 8, wherein the operation corresponding to the identified point of detection of the calculated pressure level varies according to the calculated pressure level.

10. The operating method of claim 7, wherein the transparent conductive layer is formed of ITO.

11. An operating method of a mobile terminal, the operating method comprising:
   providing a display module including a transparent conductive layer configured to have a plurality of cells whose charge quantity varies in response to a touch signal and a plurality of pressure sensors configured to be laid over the transparent conductive layer, the cells being electrically isolated from one another, and the pressure sensors calculating a pressure level of a touch signal and identifying a point of detection of the calculated pressure level;
   if an input touch signal is received through the transparent conductive layer, determining the position of the input touch signal based on at least one of the position of at least one cell in the transparent conductive layer where a charge quantity variation is detected, and a point of detection of the pressure level of the input touch signal identified by the pressure sensors; and
   performing an operation corresponding to the determined touch signal position.

12. The operating method of claim 11, wherein the pressure sensors are arranged along the edges of the bottom of the transparent conductive layer.

* * * * *